(12) United States Patent
Chikura et al.

(10) Patent No.: US 9,604,179 B2
(45) Date of Patent: Mar. 28, 2017

(54) SPIRAL MEMBRANE ELEMENT AND METHOD OF PRODUCING THE SAME

(75) Inventors: Shinichi Chikura, Ibaraki (JP); Yuuji Nishida, Ibaraki (JP); Yasuhiro Uda, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 1029 days.

(21) Appl. No.: 12/137,317

(22) Filed: Jun. 11, 2008

(65) Prior Publication Data

US 2008/0302719 A1 Dec. 11, 2008

(30) Foreign Application Priority Data

Jun. 11, 2007 (JP) ................................ 2007-154241

(51) Int. Cl.
*B01D 63/10* (2006.01)
*C02F 1/44* (2006.01)

(52) U.S. Cl.
CPC ............... *B01D 63/10* (2013.01); *C02F 1/44* (2013.01)

(58) Field of Classification Search
None
See application file for complete search history.

(56) References Cited

U.S. PATENT DOCUMENTS

| | | |
|---|---|---|
| 3,386,876 A | 6/1968 | Wyckoff |
| 3,417,870 A * | 12/1968 | Bray .................. A23L 2/085 210/321.83 |
| 3,804,259 A * | 4/1974 | Riggleman ............ B01D 69/10 156/175 |
| 4,022,692 A | 5/1977 | Janneck |
| 4,213,858 A | 7/1980 | Boberg et al. |

(Continued)

FOREIGN PATENT DOCUMENTS

| | | |
|---|---|---|
| CN | 1170618 | 10/2005 |
| EP | 0 478 111 | 4/1992 |

(Continued)

OTHER PUBLICATIONS

Express Textile, issue: Dec. 2004: <<http://www.expresstextile.com/20041216/dyeschemicals01.shtml>>.*

(Continued)

*Primary Examiner* — Krishnan S Menon
(74) *Attorney, Agent, or Firm* — Knobbe Martens Olson & Bear, LLP (57) ABSTRACT

A spiral membrane element that can reduce the dimension increase in the length direction is provided. Also, a method for producing a spiral membrane element is provided having a step of forming a fiber reinforced resin layer having a reinforcing fiber layer and a strengthening fiber layer. The spiral membrane element is provided with a cylindrical wound body in which a separation membrane, a feed-side channel material, and a permeate-side channel material in a laminated state are wound in a spiral form around a center tube having a hole, and a sealing part for preventing feed-side fluid and permeate-side fluid from being mixed with each other, wherein a fiber reinforced resin layer having a reinforcing fiber layer and a strengthening fiber layer enclosed and buried with the same resin is provided on an outer circumferential side of the cylindrical wound body.

16 Claims, 7 Drawing Sheets

(56) References Cited

U.S. PATENT DOCUMENTS

| | | | |
|---|---|---|---|
| 4,225,438 A | | 9/1980 | Miller et al. |
| 4,475,973 A | * | 10/1984 | Tanaka .................. B01D 63/10 156/184 |
| 4,902,417 A | | 2/1990 | Lien |
| 5,073,263 A | * | 12/1991 | Fagundes et al. ........ 210/321.83 |
| 5,114,582 A | | 5/1992 | Sandstrom et al. |
| 5,128,037 A | | 7/1992 | Pearl et al. |
| 5,275,726 A | * | 1/1994 | Feimer .................. B01D 63/10 210/321.74 |
| 5,562,827 A | * | 10/1996 | Schmidt et al. ........... 210/493.4 |
| 6,106,715 A | | 8/2000 | Thalmann et al. |
| 6,224,767 B1 | | 5/2001 | Fujiwara et al. |
| 6,432,310 B1 | * | 8/2002 | Andou ................. B01D 61/022 210/321.74 |
| 6,565,747 B1 | | 5/2003 | Shintani et al. |
| 6,881,336 B2 | | 4/2005 | Johnson |
| 7,326,659 B2 | | 2/2008 | Cederblad et al. |
| 7,326,660 B2 | | 2/2008 | Walraevens et al. |
| 8,303,815 B2 | | 11/2012 | Beppu et al. |
| 8,361,318 B2 | | 1/2013 | Chikura et al. |
| 2003/0205520 A1 | | 11/2003 | Johnson |
| 2004/0182774 A1 | | 9/2004 | Hirokawa et al. |
| 2005/0077229 A1 | | 4/2005 | Ishii |
| 2005/0194317 A1 | * | 9/2005 | Ikeyama et al. .............. 210/652 |
| 2006/0265814 A1 | * | 11/2006 | Ritter ..................... A01N 25/34 8/115.51 |
| 2007/0062857 A1 | | 3/2007 | Popa et al. |
| 2007/0175812 A1 | | 8/2007 | Chikura et al. |
| 2007/0196185 A1 | | 8/2007 | Kohel et al. |
| 2007/0199654 A1 | | 8/2007 | Kohel et al. |
| 2008/0190836 A1 | | 8/2008 | Beppu et al. |
| 2009/0026130 A1 | | 1/2009 | Chikura et al. |
| 2009/0065426 A1 | | 3/2009 | Ishii et al. |
| 2010/0096316 A1 | | 4/2010 | Chikura et al. |
| 2010/0108593 A1 | | 5/2010 | Chikura et al. |

FOREIGN PATENT DOCUMENTS

| | | |
|---|---|---|
| EP | 0 508 646 | 10/1992 |
| GB | 2164871 A | 4/1986 |
| JP | 53-124179 | 10/1978 |
| JP | 62-27701 | 2/1987 |
| JP | 64-003444 | 1/1989 |
| JP | 4-018921 | 1/1992 |
| JP | 4-326926 | 11/1992 |
| JP | 05-123545 | 5/1993 |
| JP | 5-168869 | 7/1993 |
| JP | 06-007649 | 1/1994 |
| JP | 10-137558 | 5/1998 |
| JP | 10-156152 | 6/1998 |
| JP | 10-230140 | 9/1998 |
| JP | 10-230145 | 9/1998 |
| JP | 10-309445 | 11/1998 |
| JP | 11-235520 | 8/1999 |
| JP | 2000-000437 | 1/2000 |
| JP | 2000-042378 | 2/2000 |
| JP | 2000-153270 | 6/2000 |
| JP | 2000-354742 | 12/2000 |
| JP | 2001-017840 | 1/2001 |
| JP | 2001-300271 | 10/2001 |
| JP | 2004-050005 | 2/2004 |
| JP | 2004-089763 | 3/2004 |
| JP | 2004-283708 | 10/2004 |
| JP | 2005-103516 | 4/2005 |
| JP | 2005-178010 | 7/2005 |
| JP | 2005-279377 | 10/2005 |
| JP | 2006-507919 | 3/2006 |
| JP | 2007-531616 | 11/2007 |
| JP | 2009-233629 A | 10/2009 |
| WO | WO 03/092872 A1 | 11/2003 |
| WO | WO 2004/009222 A1 | 1/2004 |
| WO | WO 2005/097305 A1 | 10/2005 |

OTHER PUBLICATIONS

File History of the related U.S. Appl. No. 10/593,760, for the period of May 7, 2009-Jul. 21, 2010.
File History of the related U.S. Appl. No. 11/722,659, for the period of May 7, 2009-Jul. 21, 2010.
File History of the related U.S. Appl. No. 12/282,138, for the period of May 7, 2009-Jul. 21, 2010.
File History of the related U.S. Appl. No. 12/282,550, for the period of May 7, 2009-Jul. 21, 2010.
File History of the related U.S. Appl. No. 12/642,400, as of Jul. 21, 2010.
File History of the related U.S. Appl. No. 12/642,653, as of Jul. 21, 2010.
Da Costa et al., "Net-type spacers: Effect of configuration on fluid flow path and ultrafiltration flux." Ind. Eng. Chem. Res., vol. 33, 1994: 1845-1851.
International Search Report issued on the related PCT Application No. PCT/JP2007/054466, dated Jun. 12, 2007.
International Search Report issued on the related PCT Application No. PCT/JP2007/054637, dated Jun. 12, 2007.
Microfilm of the specification and drawings annexed to the request of Japanese Utility Model Application No. 025197/1981 (Laid-open No. 140803/1982).
Song et al., "Numerical studies of the impact of spacer geometry on concentration polarization in spiral wound membrane modules." Ind. Eng. Chem. Res., vol. 44, 2005: 7638-7645.
File History of the related U.S. Appl. No. 10/593,760, for the period of Jun. 25, 2008-Jan. 15, 2009.
File History of the related U.S. Appl. No. 11/722,659, for the period of Jun. 25, 2008-Jan. 15, 2009.
File History of the related U.S. Appl. No. 12/282,138, as of Jan. 15, 2009.
File History of the related U.S. Appl. No. 12/282,550, as of Jan. 15, 2009.
File History of the related U.S. Appl. No. 10/593,760, for the period of Jan. 16, 2009-May 6, 2009.
File History of the related U.S. Appl. No. 11/722,659, for the period of Jan. 16, 2009-May 6, 2009.
File History of the related U.S. Appl. No. 12/282,138, for the period of Jan. 16, 2009-May 6, 2009.
File History of the related U.S. Appl. No. 12/282,550, for the period of Jan. 16, 2009-May 6, 2009.
File History of the related U.S. Appl. No. 12/282,138, as of Jul. 22, 2010-Nov. 30, 2010.
File History of the related U.S. Appl. No. 12/282,550, as of Jul. 22, 2010-Nov. 30, 2010.
Notification of Reasons for Refusal issued in corresponding Japanese Patent application No. 2007-154241, dated Jun. 27, 2012.
Third Office Action issued by State Intellectual Property Office of People's Republic of China on Jul. 12, 2012 in the corresponding Chinese patent app. No. 200810111045.0.
Second Office Action issued by State Intellectual Property Office of People's Republic of China on Mar. 30, 2012 in the corresponding Chinese patent app. No. 200810111045.0.
The First Office Action issued by State Intellectual Property Office of People's Republic of China on Sep. 8, 2011 in the corresponding Chinese patent application No. 200810111045.0.
Wang, Jianqing, Packaging Material, National Defense Industry Press, Jun. 2004.
Notification of Reexamination issued by State Intellectual Property Office of People's Republic of China on Apr. 10, 2014 in the corresponding Chinese patent app. No. 200810111045.0.
Decision on Rejection issued by State Intellectual Property Office of People's Republic of China on Jan. 23, 2013 in the corresponding Chinese patent app. No. 200810111045.0.
International Preliminary Report on Patentability issued on the related PCT Application No. PCT/JP2005/004919, dated Apr. 26, 2005.
International Preliminary Report on Patentability issued on the related PCT Application No. PCT/JP2006/321371, dated May 6, 2008.

(56) References Cited

OTHER PUBLICATIONS

International Search Report issued on the related PCT Application No. PCT/JP2005/004919, dated Apr. 26, 2005.
International Search Report issued on the related PCT Application No. PCT/JP2006/321371, dated Dec. 26, 2006.
File History of the related U.S. Appl. No. 10/593,760, as of Jun. 23, 2008.
File History of the related U.S. Appl. No. 11/722,659, as of Jun. 23, 2008.

* cited by examiner

(a) CROSS-SECTIONAL PHOTOGRAPH (b) PARTIAL MODEL VIEW OF THE PHOTOGRAPH

FIG.5

(a) CROSS-SECTIONAL PHOTOGRAPH (b) PARTIAL MODEL VIEW OF THE PHOTOGRAPH

SPIRAL MEMBRANE ELEMENT AND METHOD OF PRODUCING THE SAME

This application claims priority to Japanese Patent Application No. 2007-154241, filed Jun. 11, 2007. The above-referenced application is hereby expressly incorporated by reference in its entirety.

BACKGROUND OF THE INVENTION

Field of the Invention

The present invention relates to a spiral membrane element capable of separating specified components that are present in various fluids (liquid or gas), in which a separation membrane, a feed-side channel material, and a permeate-side channel material in a laminated state are wound in a spiral form around a center tube having a hole, as well as to a method of producing the same.

Description of the Background Art

Figure 6:
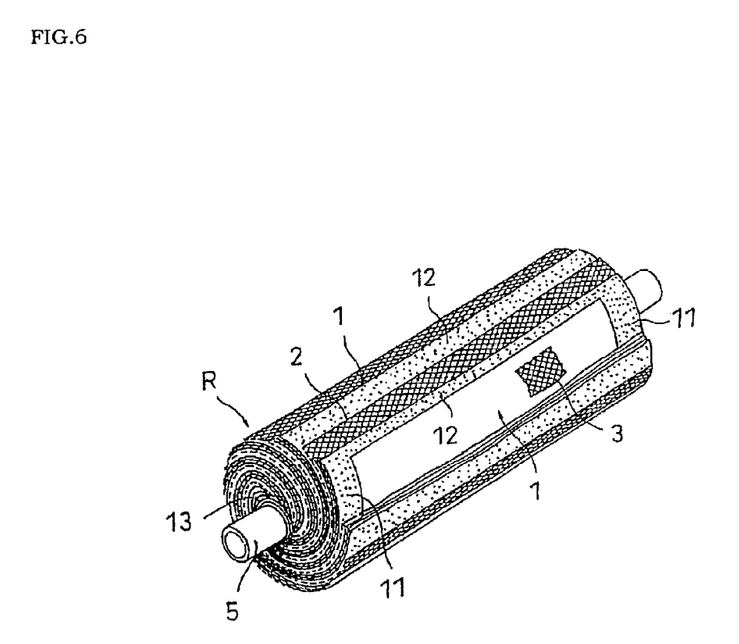
FIG. 6 is a partially broken perspective view showing one example of a spiral membrane element according to the prior art (present invention)

Conventionally, as a fluid separating element used in reverse osmosis filtration, microfiltration, or the like, there is known a spiral membrane element provided with a cylindrical wound body R in which a separation membrane 1, a feed-side channel material 2, and a permeate-side channel material 3 in a laminated state are wound in a spiral form around a center tube 5 having a hole, where sealing parts 11 to 13 are disposed for preventing feed-side fluid and permeate-side fluid from being mixed with each other, for example, as shown in FIG. 6.

In this spiral membrane element, the feed-side fluid (feed water) is led to the surface of the separation membrane 1 by the feed-side channel material 2 and, after being separated by being transmitted through the separation membrane 1, the permeate-side fluid (permeate water) is led to the center tube 5 (water collection tube) along the permeate-side channel material 3. Further, in some cases in such a spiral membrane element, a fiber reinforced resin (FRP) may be disposed on an outer circumference as an outer cladding layer for the purpose of imparting the pressure resistance and the shape retaining property at the time of operation in a pressurized state.

Figure 7:
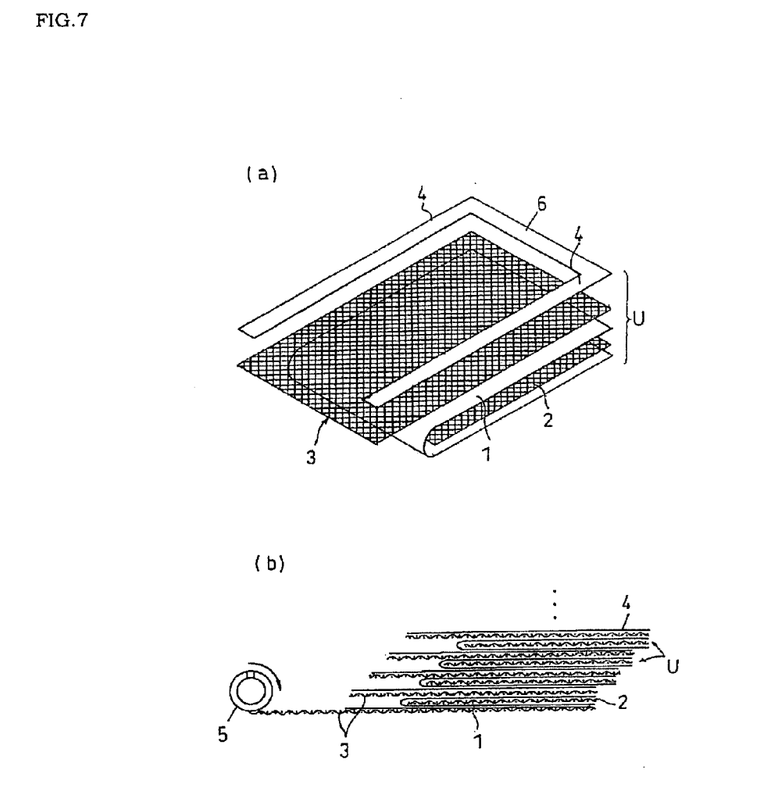
FIGS. 7(a) and 7(b) are step views showing one example of a method of producing a spiral membrane element according to the prior art (present invention).

As shown in FIGS. 7(a) and 7(b), such a spiral membrane element is generally produced by stacking a permeate-side channel material 3 onto a material obtained by disposing a feed-side channel material between two leaves of a two-folded separation membrane 1, applying adhesives 4, 6 on the permeate-side channel material 3 located on the separation membrane peripheral parts (three sides) so as to form sealing parts for preventing the feed-side fluid and the permeate-side fluid from being nixed with each other thereby to fabricate a separation membrane unit U, winding a single unit or a plurality of these units in a spiral form around the center tube 5, and further sealing the separation membrane peripheral parts. In this example, a plurality of membrane leaves (sealed envelope-shaped membranes) are present; however, there are cases in which a single membrane leaf is present.

Also, for forming the outer cladding material, there is known a method of winding polypropylene fibers impregnated with epoxy resin (in other examples, heat-resistant alkali plastic material fibers) around the outer circumferential surface of the cylindrical wound body after winding the membrane leaves around the center tube, followed by curing this to form the outer cladding material as a fiber-reinforced resin (FRP) (See Japanese Patent Application Laid-Open (JP-A) No. 2000-354742, FIG. 3, Paragraph No. 0037). Also, there is known a method of winding a net-shaped substance (heat-resistant alkali plastic material) having a cylindrical shape or a planar shape, and being embedded (curing to support) with an epoxy resin (See JP-A No. 2000-354742, FIGS. 4 and 5, Paragraph Nos. 0038 and 0039).

Also, as a method of forming an outer cladding layer, there is known a method of winding glass fibers on the outer circumferential surface of the cylindrical wound body, and further disposing an epoxy resin layer for protection of the glass fibers exposed to the surface after being embedded with an epoxy resin (See Japanese Patent Application Laid-Open (JP-A) No. 2001-17840, claim 1, FIG. 1).

SUMMARY OF THE INVENTION

However, in the case of the above-described spiral membrane element formed with a conventionally known outer cladding material, the whole outer cladding material swells by the influence of the moisture absorption (water absorption) of the epoxy resin. In particular, when the dimension increases in the length direction of the spiral membrane element, there may occur a case such that, in loading the spiral membrane element into a vessel, an end plate for sealing the vessel cannot be fully fastened, thereby raising a problem.

Thus, an object of the present invention is to provide a spiral membrane element that can reduce the dimension increase in the length direction by forming a fiber reinforced resin layer having a reinforcing fiber layer and a strengthening fiber layer. Also, another object of the present invention is to provide a method of producing a spiral membrane element having a step of forming a fiber reinforced resin layer having a reinforcing fiber layer and a strengthening fiber layer.

The aforementioned object can be achieved by the present invention such as described below.

The spiral membrane of the present invention is a spiral membrane element including a cylindrical wound body in which a separation membrane, a feed-side channel material, and a permeate-side channel material in a laminated state are wound in a spiral form around a center tube having a hole; and a sealing part for preventing feed-side fluid and permeate-side fluid from being mixed with each other, wherein a fiber reinforced resin layer having a reinforcing fiber layer and a strengthening fiber layer embedded with the same resin is provided.

According to the spiral membrane element of the present invention, on an outer circumferential side of a cylindrical wound body, a fiber reinforced resin layer is disposed for reinforcing and supporting the cylindrical wound body. This fiber reinforced resin layer is composed to include a reinforcing fiber layer formed with fibers and a strengthening fiber layer formed with fibers for firmly supporting this reinforcing fiber layer. Further, the reinforcing fiber layer and the strengthening fiber layer are embedded with the same resin. When this resin is made to adhere to and/or is impregnated into the strengthening fiber layer in advance, it is preferably composed in such a manner that the gap between the fibers of the reinforcing fiber layer is embedded with this resin. When the resin penetrates into the gap between the fibers and into the inside of the fibers of the reinforcing fiber layer by capillary phenomenon, to be embedded, the resin will be integrated with the fibers after curing, thereby increasing the strength of the reinforcing fiber layer. Alternatively, it is considered that, by restraining the swelling by moisture absorption of the resin, the dimension increase in the length direction of the spiral membrane element can be reduced. Also, there are cases in which the resin does not penetrate into the inside of the fibers (for example, the Wall Span or the like) of the reinforcing fiber layer; however, since the gap between the fibers is embedded, the strength of the reinforcing fiber layer will increase.

Also, as one example of a preferable embodiment of the present invention, the reinforcing fiber layer is impregnated with the resin.

With this constitution, since the inside of the fibers of the reinforcing fiber layer is impregnated with the resin, the effect will be higher as compared with the constitution in which the gap between the fibers is embedded.

Also, as one example of a preferable embodiment of the present invention, there is a constitution in which a resin sheet or a resin film is made to intervene between the cylindrical wound body and the fiber reinforced resin layer. As a material for the resin, for example, various plastics can be exemplified. The determination of whether it is a sheet or a film is as follows. When the thickness thereof exceeds 100 μm, it is a sheet, and when the thickness is 100 μm or less, it is a film. Also, as a resin sheet, a sheet-shaped body (including a form subjected to roving) formed with glass fibers can be exemplified.

When a sheet-shaped body formed with glass fibers is used, the dimension increase in the length direction of the spiral membrane element can be further reduced.

Also, as one example of a preferable embodiment of the present invention, there is a constitution in which the thickness of the fiber layer of the reinforcing fiber layer is 0.1 mm or more. This is because, when the thickness is less than 0.1 mm, the dimension increase in the length direction of the spiral membrane element cannot be sufficiently reduced. For example, the spiral membrane element cannot be loaded on a vessel. Also, when the thickness of the fiber layer of the reinforcing fiber layer exceeds 0.6 mm, the resin hardly penetrates.

Also, as one example of a preferable embodiment of the present invention, one direction of the fibers of the reinforcing fiber layer is disposed in the length direction of the spiral membrane element. The length direction is approximately parallel to the flow direction. Also, it is preferable that the fibers disposed in the length direction traverses longitudinally over the entire length. This can further restrain the elongation of the spiral membrane element.

Also, as one example of a preferable embodiment of the present invention, there is a constitution in which the reinforcing fiber layer is formed to be an inner layer and the strengthening fiber layer is formed to be an outer layer when the fiber reinforced resin layer is formed on an outer circumferential side of the cylindrical wound body. Also, as one example of a preferable embodiment of the present invention, there is a constitution in which the reinforcing fiber layer is formed to be an outer layer and the strengthening fiber layer is formed to be an inner layer when the fiber reinforced resin layer is formed on an outer circumferential side of the cylindrical wound body. Also, as one example of a preferable embodiment of the present invention, there is a constitution in which the strengthening fiber layer is formed to have a multiple-layer structure so as to sandwich the reinforcing fiber layer when the fiber reinforced resin layer is formed on an outer circumferential side of the cylindrical wound body.

By these constitutions, the dimension increase in the length direction of the spiral membrane element can be sufficiently reduced. In the present invention, different effects are produced depending on the volume of the fibers (cloth) of the reinforcing fiber layer (mainly the fibers in the length direction). For example, it depends on the mass, the thickness, and the density of the fibers (cloth).

Also, another method of producing a spiral membrane element according to the present invention is a method of producing a spiral membrane element including a cylindrical wound body in which a separation membrane, a feed-side channel material, and a permeate-side channel material in a laminated state are wound in a spiral form around a center tube having a hole; a sealing part for preventing feed-side fluid and permeate-side fluid from being mixed with each other; and an outer cladding layer disposed on an outer circumferential side of the cylindrical wound body, where the method includes a step of forming a fiber reinforced resin layer having a reinforcing fiber layer formed with fibers that support the cylindrical wound body and a strengthening fiber layer which a resin that embeds the fibers of the reinforcing fiber layer is made to adhere to and/or is impregnated with, on an outer circumferential side of the cylindrical wound body.

Another method of producing a spiral membrane element includes, in the step of forming the fiber reinforced resin layer, a step of forming the strengthening fiber layer as an outer layer by winding the fibers immediately after adherence and/or impregnation of the resin so as to cover the outer circumferential side of the reinforcing fiber layer after forming the reinforcing fiber layer as an inner layer on the outer circumferential side of the cylindrical wound body.

Another method of producing a spiral membrane element includes, in the step of forming the fiber reinforced resin layer, a step of forming the strengthening fiber layer as an inner layer by winding the fibers immediately after adherence and/or impregnation of the resin so as to cover the outer circumferential side of the cylindrical wound body, and a step of forming the reinforcing fiber layer as an outer layer immediately after the step of forming the strengthening fiber layer.

Another method of producing a spiral membrane element includes, in the step of forming the fiber reinforced resin layer, a step of forming a first strengthening fiber layer by winding the fibers immediately after adherence and/or impregnation of the resin so as to cover the outer circumferential side of the cylindrical wound body, a step of forming the reinforcing fiber layer immediately after the step of forming the first strengthening fiber layer, and a step of forming a second strengthening fiber layer by winding the fibers immediately after adherence and/or impregnation of the resin so as to cover the outer circumferential side of the reinforcing fiber layer after the step of forming the reinforcing fiber layer.

The spiral membrane element produced by the above-described production methods exhibits the same functions and effects as described above.

BRIEF DESCRIPTION OF THE DRAWINGS

FIGS. 2(a) to 2(f) are cross-sectional views showing examples of a fiber reinforced resin layer;

DETAILED DESCRIPTION OF THE PREFERRED EMBODIMENTS

Figure 1:
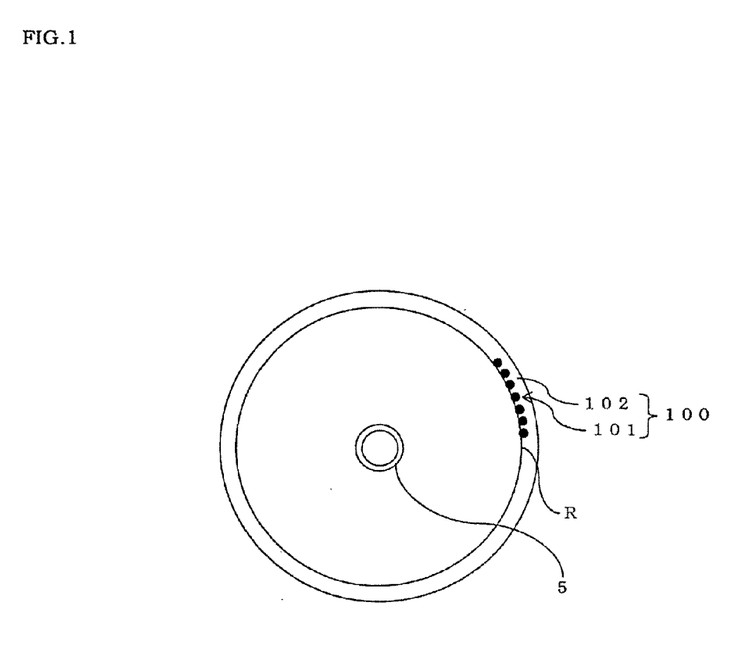
FIG. 1 is a cross-sectional view showing one example of a spiral membrane element according to the present invention.

Hereafter, embodiments of the present invention will be described with reference to the attached drawings. FIG. 1 is a cross-sectional view showing one example of a spiral membrane element of the present invention.

With regard to the spiral membrane element of the present invention, the method of forming the outer cladding layer and the structure thereof are different from those of the conventional one, so that, for the other structures, any one of the above-described constitution of the conventional spiral membrane element can be applied.

Therefore, as shown in FIG. 6, the spiral membrane element of the present invention is provided with a cylindrical wound body R in which a separation membrane 1, a feed-side channel material 2, and a permeate-side channel material 3 in a laminated state are wound in a spiral form around a center tube 5 having a hole, and is further provided with a sealing part for preventing feed-side fluid and permeate-side fluid from being mixed with each other. The sealing part includes, for example, a two-end sealing part 11 and an outer circumference side sealing part 12, and also a sealing part 13 may be formed for sealing the surroundings of the center tube 5.

The spiral membrane element of the present invention can be produced by a method including a step of forming a cylindrical wound body R by winding a separation membrane 1, a feed-side channel material 2, and a permeate-side channel material 3 that are in a laminated state in a spiral form around a center tube 5 having a hole, and a step of forming sealing parts 11, 12 for preventing feed-side fluid and permeate-side fluid from being mixed with each other. Specifically, the spiral membrane element can be produced, for example, by performing the steps shown in FIGS. 7(a) and 7(b).

Referring to FIG. 7(a), first a permeate-side channel material 3 is stacked onto a material obtained by disposing a feed-side channel material 2 between two leaves of a two-folded separation membrane 1, and then adhesives 4, 6 for forming sealing parts to prevent the feed-side fluid and the permeate-side fluid from being mixed with each other are applied onto the two end parts in the axial direction and the winding finishing part of the permeate-side channel material 3, thereby fabricating a unit. At this time, a protective tape may be bonded to the folding part of the separation membrane 1.

For the separation membrane 1, a reverse osmosis membrane, an ultrafiltration membrane, a microfiltration membrane, a gas separation membrane, a degassing membrane, and the like can be used. For the feed-side channel material 3, a net-shaped material, a mesh-shaped material, a sheet having a groove, a wave-shaped sheet, or the like can be used. For the permeate-side channel material 3, a fiber cloth such as non-woven cloth, woven cloth, or knitted cloth, a net-shaped material, a mesh-shaped material, a sheet having a groove, a wave-shaped sheet, or the like can be used.

The center tube 5 having a hole may be one having an opening around a tube, so that any of the conventional ones can be used. Generally, the center tube 5 is formed with a material such as ABS resin, polyphenylene ether (PPE), or polysulfone, and the diameter thereof is, for example, 20 to 100 mm though it depends on the size of the membrane element.

As the adhesives 4, 6, any of the conventionally known adhesives such as urethane based adhesive, epoxy based adhesive, and hot melt adhesive can be used. However, in performing the curing reaction by heating, an adhesive containing a thermosetting resin such as urethane based adhesive or epoxy based adhesive is preferable.

Next, as shown in FIG. 7(b), a plurality of these separation membrane element units U are laminated and wound in a spiral form around a center tube 5 having a hole, followed by curing the adhesive to form the sealing parts 11, 12, and 13. At this time, an adhesive tape may be wound in a coil shape, so as to retain the shape of the cylindrical wound body R.

The number of separation membrane units U to be laminated is determined in accordance with the needed transmittance flow rate, and one or more layers is sufficient; however, about a hundred layers is the upper limit in consideration of the operability. Here, the longer the length of the separation membrane unit U is, the smaller the number of the layers to be laminated will be.

(Fiber Reinforced Resin Layer and Step of Forming it)

The fiber reinforced resin layer of the present invention is formed to include a reinforcing fiber layer formed with fibers that reinforce and support the cylindrical wound body and a strengthening fiber layer formed with fibers which the resin that embeds the fibers of the reinforcing fiber layer is made to adhere to and/or is impregnated with. Further, a constitution can be made so that a resin sheet or a resin film is made to intervene between the cylindrical wound body and the reinforcing fiber layer.

The fibers of the reinforcing fiber layer may be composed, for example, as an assembly of fibers, and may be formed in a cloth shape or may be composed as a cloth shape in which an opening is formed. As a fiber material, glass fibers or various plastic fibers such as PET, PP, PE, PSF (polysulfone), and acrylic resin can be included as examples.

In the case of a fiber cloth composed in a cloth shape, for example, in addition to fiber cloth made of resin such as various plastics such as PET, PSF, and acrylic resin, and resin such as polyphenylene sulfide (PPS) and the like, glass fiber cloth such as glass cloth, metal fiber cloth such as metal mesh screen, and the like can be used. In the case of providing a display label in the inside, it is preferable to use fiber cloth made of glass fiber cloth such as glass cloth or transparent resin in view of enhancing the visibility thereof.

Also, as the thickness of the fiber cloth, a range of 0.1 to 0.6 mm can be exemplified, preferably a range of 0.13 to 0.35 mm. In this case, the thickness is set from the viewpoint of impregnation property of the resin and the restraint of elongation. In proportion to the thickness, the amount of the needed resin increases. When the thickness is too small, the effect of restraining the elongation will be lower (besides this, it will fluctuate depending on the mass and the density).

Also, the mass of the fiber cloth may be, for example, within a range from 80 to 500 g/m$^2$, preferably within a range from 100 to 350 g/m$^2$. In this case, the mass is set from the viewpoint of impregnation property of the resin and the restraint of elongation. In proportion to the mass, the needed amount of resin increases. Also, when the mass is small, the effect of restraining the elongation will be small (besides this, it will fluctuate depending on the thickness and the density).

Also, the density of the fiber cloth (density of one fiber bundle) may be, for example, within a range from 10 to 50/inch, preferably within a range from 15 to 25/inch. The density is set from the viewpoint of restraining the elongation. When the density is small, the effect of restraining the elongation will be small (besides this, it will fluctuate depending on the mass and the thickness).

Also, the tensile strength of the fiber cloth may be, for example, within a range from 200 to 2000 N/inch, preferably within a range from 400 to 1500N/inch. In this case, the tensile strength is set from the viewpoint of restraining the elongation. When the tensile strength is small, the effect of restraining the elongation will be small. For the fiber constitution of the reinforcing fiber layer, either fiber constitution with seams and without seams can be used.

Also, the opening ratio of the fiber cloth may be, for example, within a range from 1 to 80%, preferably within a range from 10 to 30%. The opening ratio can be set from the viewpoint of transmittance of the resin (escaping to the back surface), the adhesiveness between the reinforcing fiber layer (inner) and the wound body, and the like. When the opening ratio is small, it is not preferable that the resin is not sufficiently transferred to the back surface (the wound body side), thereby disadvantageously lowering the adhesive force. For example, in the event that a fiber cloth is wound around the wound body and a strengthening fiber layer is formed thereon, the resin on the strengthening fiber side is transmitted through the fiber cloth for bonding the wound body or the product label to the fiber cloth (layer) interface, whereby the wound body (or the product label)/fiber cloth (layer) interface is filled with the resin. For this reason, the opening ratio of the fiber cloth needs to be 10% or more. Also, when the product label is stuck onto the wound body, the visibility is required. In this case, close adhesion between the wound body (product label) and the fiber cloth is required. When close adhesion is not established, there will be an intervening air layer, thereby considerably lowering the visibility. When the visibility on the wound body surface is not required, the opening ratio can be 10% or less in the above-described production method.

The kinds of the fiber cloth may be, for example, non-woven cloth, woven cloth, knitted cloth, or the like. From the viewpoint of reinforcing effect and the visibility, woven cloth such as plain weave fabric, twill weave fabric, satin weave fabric, imitation gauze weave fabric, or leno weave fabric is preferable.

The fiber of the strengthening fiber layer has a resin for embedding the fibers of the reinforcing fiber layer attached thereto and/or is impregnated with the resin. As these fibers, a product twisted to a multi-filament or a mono-filament if necessary, or an assembled bundle body thereof can be used; however, various rovings can be preferably used. Also, as the kind of the fibers, for example, besides resin fibers such as PET, PP, PE, PSF, polyphenylene sulfide (PPS), or aramid, inorganic fibers such as glass and metal fibers such as steel wire can be used. However, when the display label is to be provided in the inside, it is preferable to use fibers made of glass fibers or transparent resin from the viewpoint of enhancing the visibility thereof. Also, from the viewpoint of strength, the diameter of the fibers is preferably large. However, when the diameter is too large, the thickness of the outer cladding layer will be disadvantageously large. Therefore, from these viewpoints, the diameter can be suitably designed. Also, in the case of a wound body formed by winding glass fibers as the strengthening fiber layer, the thickness thereof may be, for example, within a range from 0.5 to 4.0 mm.

The resin for embedding the fibers of the reinforcing fiber layer may be, for example, thermosetting resin. In particular, as a resin for improving the visibility, epoxy resin, polyester resin, polyurethane resin, or the like can be included as an example.

The resin material of the resin sheet or the resin film may be, for example, various plastics. Also, the resin sheet may be, for example, a sheet-shaped body formed with glass fibers (including a mode subjected to roving), glass cloth, or the like. For the resin sheet or the resin film, either a product with seams and a product without seams can be used.

(Embodiment 1)

In the step of forming the fiber reinforced resin layer, after a reinforcing fiber layer (for example, glass cloth) is formed as an inner layer on the outer circumferential side of a cylindrical wound body (for example, after glass cloth having a planar shape is wound therearound for one to several times), the fibers (for example, glass roving) immediately after attachment and/or impregnation of a resin (for example, epoxy resin) are wound in a spiral form without a gap so as to cover the outer circumferential side of the reinforcing fiber layer so as to form a strengthening fiber layer as an outer layer. Preferably, the fibers (glass cloth fibers) of the reinforcing fiber layer are arranged to traverse longitudinally over the entire length relative to the length direction of the cylindrical wound body.

At this time, it is necessary to provide a step of attaching a resin (epoxy resin) to the fibers (glass roving) and/or impregnating the fibers (glass roving) with the resin, and immediately thereafter, the fibers must be wound on the outer circumferential side of the reinforcing fiber layer. The amount of the resin subjected to attachment and/or impregnation can be suitably set depending on the thickness of the reinforcing fiber layer and the fibers (glass roving).

The resin (epoxy resin) attached to or subjected to impregnation of the fibers (glass roving) penetrates into a gap between the fibers or into the fibers of the reinforcing fiber layer (glass cloth) and is cured. As the curing step, there is a method of leaving it to stand quietly at room temperature (for example, 12 to 27° C.); however, the curing time can be shortened by heating. The heating time may be, for example, within a range from 30 to 130° C., preferably within a range from 50 to 90° C., though it depends on the resin material.

Figure 2:
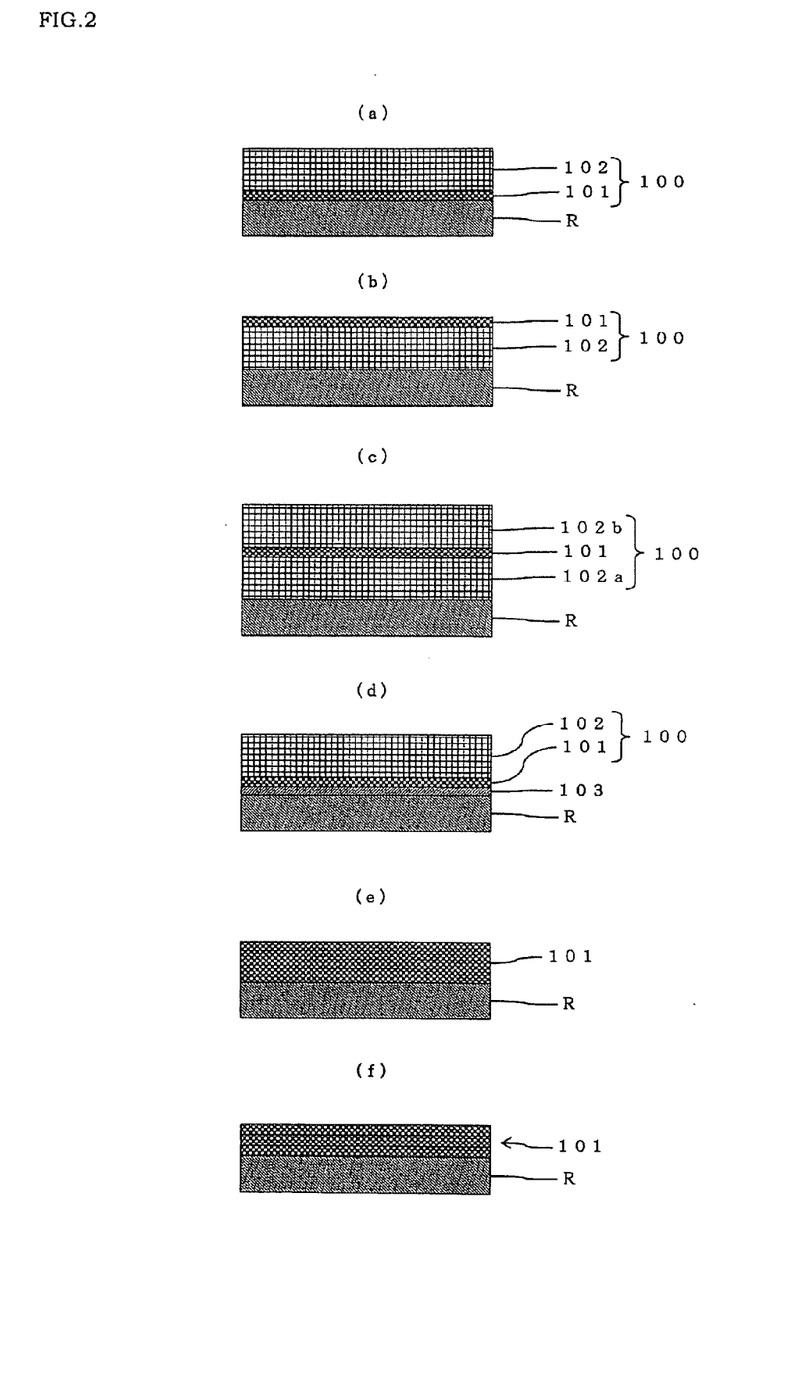

FIG. 2(a) shows a model view of a constitution example of a cylindrical wound body R/reinforcing fiber layer 101 (inner layer)/strengthening fiber layer 102 (outer layer) formed by the above-described method. The combined thickness of the reinforcing fiber layer 101 (inner layer)/strengthening fiber layer 102 (outer layer) is preferably within a range from 0.5 to 4.0 mm.

(Embodiment 2)

In the step of forming the fiber reinforced resin layer, the fibers (for example, glass roving) immediately after attachment and/or impregnation of a resin (for example, epoxy resin) are wound in a spiral form without a gap so as to cover the outer circumferential side of a cylindrical wound body so as to form a strengthening fiber layer as an outer layer. Immediately after forming the strengthening fiber layer (before curing), a reinforcing fiber layer (glass cloth) is formed as an outer layer.

The resin (epoxy resin) attached to or subjected to impregnation of the fibers (glass roving) penetrates into a gap between the fibers or into the fibers of the reinforcing fiber layer (glass cloth) and is cured.

FIG. 2(b) shows a model view of a constitution example of a cylindrical wound body R/strengthening fiber layer 102 (inner layer)/reinforcing fiber layer 101 (outer layer) formed by the above-described method. The combined thickness of the cylindrical wound body R/strengthening fiber layer 102 (inner layer)/reinforcing fiber layer 101 (outer layer) is preferably within a range from 0.5 to 4.0 mm.

(Embodiment 3)

In the step of forming the fiber reinforced resin layer, the fibers (for example, glass roving) immediately after attachment and/or impregnation of a resin (for example, epoxy resin) (before curing) are wound without a gap so as to cover the outer circumferential side of a cylindrical wound body so as to form a first strengthening fiber layer. Subsequently, immediately after the step of forming the first strengthening fiber layer (before curing), a reinforcing fiber layer (for example, winding a glass cloth) is formed. During this time, the resin (epoxy resin) attached to or subjected to impregnation of the fibers (glass roving) penetrates into a gap between the fibers or into the fibers of the reinforcing fiber layer (glass cloth) and is cured.

However, after curing, before curing, or before curing completely (after the step of forming the reinforcing fiber layer), the fibers (glass roving) immediately after attachment and/or impregnation of a resin (epoxy resin) are wound without a gap so as to cover the outer circumferential side of the reinforcing fiber layer (glass cloth) so as to form a second strengthening fiber layer.

The resin (epoxy resin) attached to or subjected to impregnation of the fibers (glass roving) is transferred to the reinforcing fiber layer (glass cloth) and is cured.

FIG. 2(c) shows a model view of a constitution example of a cylindrical wound body R/first strengthening fiber layer 102a/reinforcing fiber layer 101/second strengthening fiber layer 102b formed by the above-described method. The combined thickness of the cylindrical wound body R/first strengthening fiber layer 102a/reinforcing fiber layer 101/second strengthening fiber layer 102b is preferably within a range from 0.5 to 4.0 mm.

(Embodiment 4)

First, a resin sheet (or resin film) is wound on the outer circumferential side of a cylindrical wound body. Thereafter, with use of the production methods of the above-described embodiments 1 to 3, a fiber reinforced resin layer is formed on the outer circumferential side of the resin sheet. FIG. 2(d) shows a model view of a construction example of a cylindrical wound body R/resin sheet 103/fiber reinforced resin layer 100. The combined thickness of the resin sheet/fiber reinforced resin layer is preferably within a range from 0.5 to 4.0 mm.

(Embodiment 5)

A reinforcing fiber layer immediately after attachment and/or impregnation of a resin (for example, epoxy resin) is formed on the outer circumferential side of a cylindrical wound body (for example, by winding a glass cloth having a planar shape for one time). The seams of the end parts with each other may be bonded with an adhesive agent or the like, or alternatively may be provisionally fixed with an adhesive tape which may be peeled off after curing of the resin. The width of the fiber cloth (glass cloth having a planar shape) is preferably matched to the width of the cylindrical wound body R. When the fiber cloth is to be made as a single layer, the thickness thereof is preferably set to be large. The thickness thereof may be, for example, within a range from 0.5 to 4.0 mm. FIG. 2(e) shows a model view of a construction example of the cylindrical wound body R/reinforcing fiber layer 101 (single layer).

(Embodiment 6)

A reinforcing fiber layer immediately after attachment and/or impregnation of a resin (for example, epoxy resin) is formed on the outer circumferential side of a cylindrical wound body (for example, by winding a glass cloth having a planar shape for plural times). The seams of the end parts with each other may be bonded with an adhesive agent or the like, or alternatively may be provisionally fixed with an adhesive tape which may be peeled off after curing of the resin. The width of the fiber cloth (glass cloth having a planar shape) is preferably matched to the width of the cylindrical wound body R. When the fiber cloth is to be made as a plurality of layers, the combined layer thickness thereof is preferably set to be large. The thickness thereof may be, for example, within a range from 0.5 to 4.0 mm. FIG. 2(f) shows a model view of a construction example of the cylindrical wound body R/reinforcing fiber layer 101 (plural layers).

Also, the thickness of the fiber reinforced resin layer may be, for example, within a range from 0.5 to 4.0 mm; however, the thickness is preferably within a range from 0.5 to 2.0 mm so as to enhance the visibility.

(Another Embodiment)

The sealing with resin of the separation membrane unit U (cylindrical wound body R) and the curing of the resin such as the fiber reinforced resin layer 26 may be carried out separately; however, in the present invention, the sealing with resin of the separation membrane unit U (cylindrical wound body R) and the curing of the resin such as the fiber reinforced resin layer 26 may be carried out simultaneously. In this case, it is preferable to use the same kind of resin as the resin of the two. Namely, in carrying out the curing reaction by heating, it is preferable to use a resin containing a thermosetting resin such as a urethane based adhesive agent or an epoxy based adhesive agent.

Also, regarding the spiral membrane element, the cylindrical wound body R after sealing with resin may be subjected to trimming or the like of the two end parts in order to adjust the length in the axial direction. Further, an end member having a hole for preventing deformation (telescope or the like), a sealing member, a reinforcing member, or the like may be provided in accordance with the needs.

Also, as a resin sheet or the like, those having a good close adhesion property with the cylindrical wound body R and having a following property are preferable and, for example, a sheet or a film of PP, PE, polyvinyl chloride (PVC), polystyrene (PS), rubber or the like can be included as examples. Such a resin sheet is wound for a length of about one round, and those having an adhesive layer are preferable.

Hereafter, Examples and others showing the constitution and the effects of the present invention will be described.

EXAMPLE 1

(1) A membrane leaf unit made of an RO membrane ES20 manufactured by Nitto Denko Corporation and a feed-side channel material made of PP and having a thickness of 0.7 mm were prepared. Next, the tip end of a permeate-side channel material made of PET and having a thickness of 0.3 mm was fixed to a hollow center tube made of PPE and having a diameter of 32 mm. The membrane leaf unit was mounted on the permeate-side channel material while applying polyurethane resin at the part abutting to the sealing part. Next, rotation was made with the hollow center tube as an axis and, while applying a tension, the mounted membrane leaf unit was wound to form a wound body. Next, an adhesive tape (width: 75 mm) was wound in a coil form without a gap around the wound body, and the shape was retained. Further, a display label having a product name printed thereon was stuck onto the surface thereof.

Figure 4:
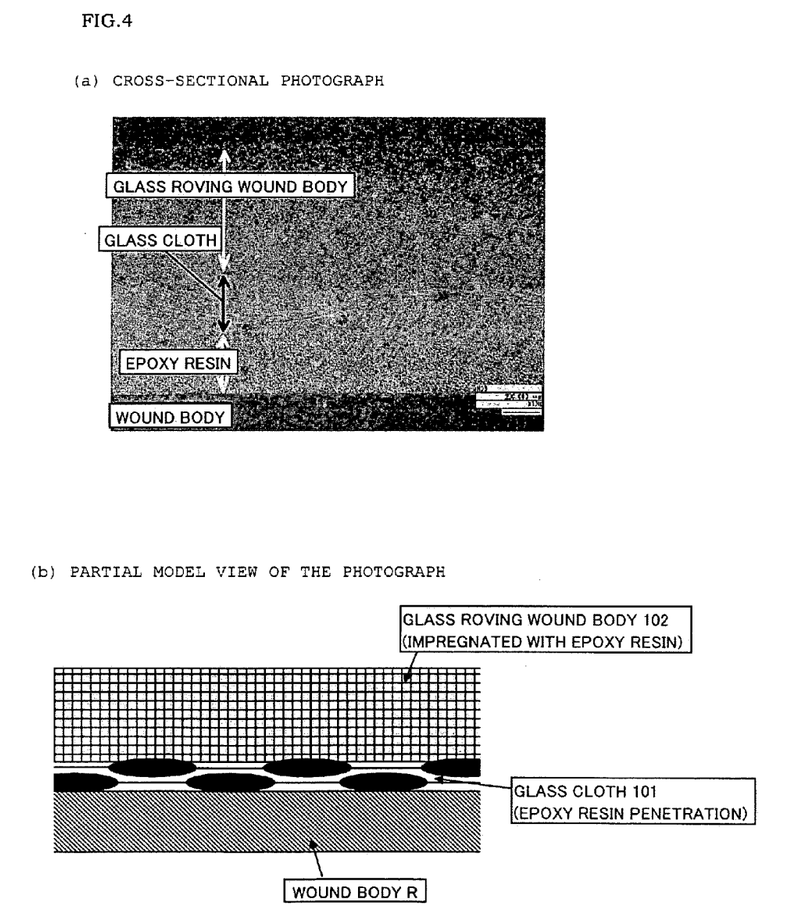
FIGS. 4(a) and 4(b) are a photograph and a model view of a cross section of a reinforcing fiber layer (glass cloth) and a strengthening fiber layer.

(2) A glass cloth (manufactured by Nitto boseki Co., Ltd., plain weave fabric) having a thickness of 0.3 mm, a mass of 340 g/m$^2$, a density (density per one fiber bundle) of 15/inch, and a tensile strength of 1300 N/inch was bonded on the whole area of the outer circumferential surface of the wound body with use of an adhesive agent. The glass cloth (fiber cloth) used here corresponds to the reinforcing fiber layer. Next, a glass roving (manufactured by Asahi Fiber Glass Co., Ltd.) having a fineness of 1150 TEX and a tensile strength of 0.245 N/TEX and impregnated with an epoxy resin (or having an epoxy resin attached thereto) was wound, and the thickness of winding was set to be 1.5 mm. The wound body of the glass roving here corresponds to the strengthening fiber layer. Thereafter, the epoxy resin was cured at 25° C. so as to fabricate a spiral membrane element. FIG. 4 shows a cross-sectional photograph and a model view of the reinforcing fiber layer (glass cloth) and the strengthening fiber layer. According to the model view of FIG. 4, it is considered that the epoxy resin moves to the glass cloth side before curing, and the epoxy resin having moved to the glass cloth is cured while being integrated with the glass cloth. Here, the fibers (glass cloth fibers) of the reinforcing fiber layer are arranged to traverse longitudinally over the entire length relative to the length direction of the cylindrical wound body.

EXAMPLE 2

A spiral membrane element was fabricated under the same condition as in the Example 1 except that the specification of the glass cloth was changed (thickness: 0.15 mm, mass: 100 g/m$^2$, density: 19 fibers/inch, tensile strength: 500N/inch) in the Example 1.

EXAMPLE 3

Figure 5:
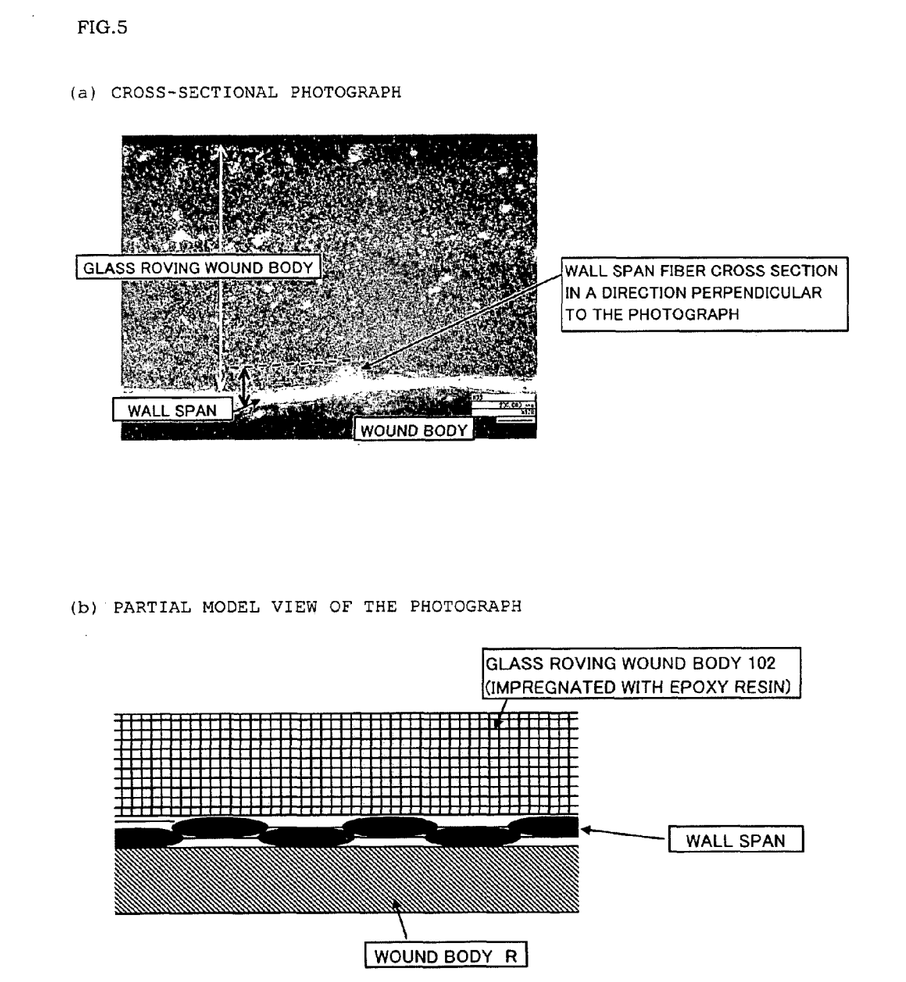
FIGS. 5(a) and 5(b) are a photograph and a model view of a cross section of a reinforcing fiber layer (Wall Span) and a strengthening fiber layer.

A spiral membrane element was fabricated under the same condition as in the Example 1 except that a band-shaped substance having a width of 48 mm and being a glass fiber tape (product name: Wall Span (manufactured by New York Wire Co., Ltd.) and corresponding to the reinforcing fiber layer) processed with a convergence processing agent having a thickness of 0.25 mm, a mass of 55 g/M$^2$, a density of 9 fibers/inch, and a tensile strength of 170 N/inch was wound in a spiral form instead of the glass cloth in the Example 1. FIGS. 5(a) and 5(b) show a photograph and a model view of a cross section of the reinforcing fiber layer (Wall Span) and the strengthening fiber layer. According to the model view of FIG. 5(b), it is considered that the elongation of the Wall Span in the length direction is restrained because the epoxy resin on the strengthening fiber layer side moves to cover (embed) the Wall Span side before curing and then is cured.

COMPARATIVE EXAMPLE

A spiral membrane element was fabricated under the same condition as in the Example 1 except that the glass cloth was not provided in the Example 1.

(Evaluation Method)

Figure 3:
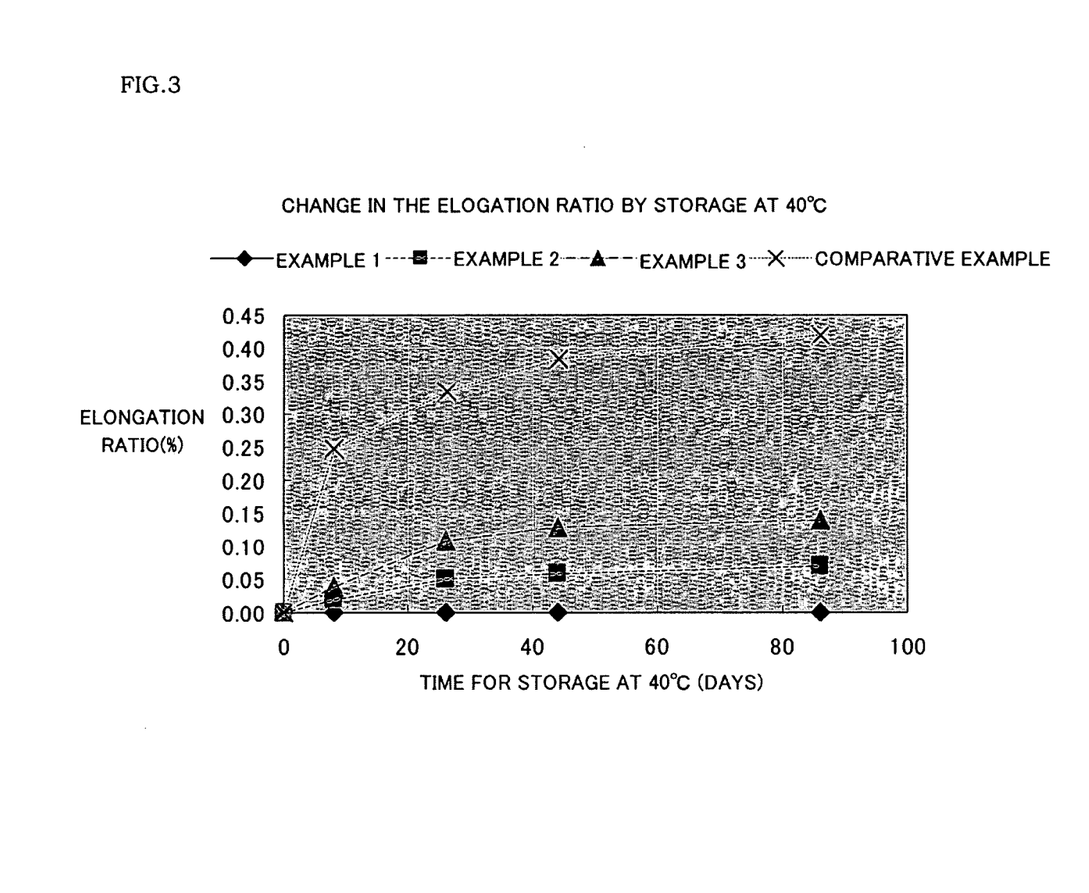
FIG. 3 is a view showing a graph of change of the elongation ratio relative to the total length with lapse of time.

Spiral membrane elements obtained in the Examples 1 to 3 and the Comparative Example were sealed within a polyethylene bag being in a humid state and put into an environment of 40° C., so as to observe the change in the total element length. FIG. 3 shows a graph of change of the elongation ratio relative to the total length with lapse of time.

(Results)

After storage for three months, the Example 1 had a dimension elongation ratio in the length direction of 0.05% or below; the Example 2 had 0.07%; the Example 3 had 0.14%; and the Comparative Example had 0.42%.

When description is made with reference to the model view of FIG. 4(b), it can be assumed that, in the Example 1 to 3, because the epoxy resin that has moved to the glass cloth (or the Wall Span) is cured while being integrated with the glass cloth (or the Wall Span), the swelling by humidity absorption of the epoxy resin of this part is restrained. Further, it can be assumed that, by composing the outer layer (or the inner layer) as a wound body of glass roving, the swelling by humidity absorption of the epoxy resin is synergistically restrained. As a result of this, at the time of storage and use of the spiral membrane element, the shape is stabilized, thereby not raising a problem in terms of the dimension.

What is claimed is:

1. A spiral membrane element comprising:
   a cylindrical wound body in which a separation membrane, a feed-side channel material, and a permeate-side channel material in a laminated state are wound in a spiral form around a center tube having a hole; and
   a sealing part for preventing feed-side fluid and permeate-side fluid from being mixed with each other,
   wherein a fiber reinforced resin layer having a reinforcing fiber layer and a strengthening fiber layer embedded with the same resin is provided on an outer circumferential side of the cylindrical wound body, wherein one direction of fibers in the reinforcing fiber layer is disposed in a length direction of the spiral membrane element, and wherein the reinforcing fiber layer comprises a fiber cloth having a mass of 80 to 500 g/m$^2$,
   wherein the the spiral membrane element is configured for intake and output water to flow in the length direction, and
   wherein the spiral membrane element has an elongation ratio of 0.14% or less after storage for three months in a humid state at 40° C.

2. The spiral membrane element according to claim 1, wherein the reinforcing fiber layer is impregnated with the resin.

3. The spiral membrane element according to claim 1, wherein a resin sheet or a resin film is provided to intervene between the cylindrical wound body and the fiber reinforced resin layer.

4. The spiral membrane element according to claim 1, wherein the reinforcing fiber layer has a fiber layer thickness of 0.1 mm or more.

5. The spiral membrane element according to claim 1, wherein the reinforcing fiber layer is formed to be an inner layer and the strengthening fiber layer is formed to be an outer layer when the fiber reinforced resin layer is formed on an outer circumferential side of the cylindrical wound body.

6. The spiral membrane element according to claim 1, wherein the reinforcing fiber layer is formed to be an outer layer and the strengthening fiber layer is formed to be an inner layer when the fiber reinforced resin layer is formed on an outer circumferential side of the cylindrical wound body.

7. The spiral membrane element according to claim 1, wherein the strengthening fiber layer is formed to have a multiple-layer structure so as to sandwich the reinforcing fiber layer when the fiber reinforced resin layer is formed on an outer circumferential side of the cylindrical wound body.

8. The spiral membrane element according to claim 1, wherein the fiber cloth has an opening ratio of 10% or more.

9. The spiral membrane element according to claim 1, wherein the fiber cloth comprises fibers selected from the group consisting of glass fibers, PET fibers, PP fibers, PE fibers, PSF fibers and acrylic fibers.

10. The spiral membrane element according to claim 1, wherein the strengthening fiber layer comprises fiber rovings.

11. The spiral membrane element according to claim 1, wherein the fibers of the strengthening fiber layer are selected from the group consisting of glass fibers, PET fibers, PP fibers, PE fibers, PSF fibers, aramid fibers, glass fibers and metal fibers.

12. The spiral membrane element according to claim 1, wherein the thickness of the strengthening fiber layer is 0.5 to 4.0 mm.

13. The spiral membrane element according to claim 1, wherein the fiber cloth is a glass fiber cloth.

14. The spiral membrane element according to claim 1, wherein the fiber cloth in the reinforcing fiber layer has a tensile strength of 200 to 2000 N/inch.

15. The spiral membrane element according to claim 1, wherein the fiber cloth in the reinforcing fiber layer has a fiber bundle density of 15 to 25/inch.

16. A spiral membrane element comprising:
a cylindrical wound body in which a separation membrane, a feed-side channel material, and a permeate-side channel material in a laminated state are wound in a spiral form around a center tube having a hole;
a sealing part for preventing feed-side fluid and permeate-side fluid from being mixed with each other;
a fiber reinforced resin layer on an outer circumference of the cylindrical body, the fiber reinforced resin layer comprising a glass cloth and fiber rovings wound around the cylindrical body, wherein the glass cloth and fiber rovings are both embedded with a common resin,
wherein the glass cloth comprises glass fibers extending parallel to a longitudinal axis of the center tube and along an entire length of the spiral membrane element, and wherein the glass cloth has a mass of 80 to 500 g/m$^2$, and
wherein the spiral membrane element has an elongation ratio of 0.14% or less after storage for three months in a humid state at 40° C.

* * * * *